(12) United States Patent
Griessbach

(10) Patent No.: US 6,169,946 B1
(45) Date of Patent: Jan. 2, 2001

(54) DEVICE AND METHOD FOR CONTROLLING ACCIDENT PROTECTION TRIGGERING DEVICES IN MOTOR VEHICLES

(75) Inventor: Robert Griessbach, Weyarn (DE)

(73) Assignee: Bayerische Motoren Werke Aktiengesellschaft, Munich (DE)

(*) Notice: Under 35 U.S.C. 154(b), the term of this patent shall be extended for 0 days.

(21) Appl. No.: 09/138,016

(22) Filed: Aug. 21, 1998

(30) Foreign Application Priority Data

Aug. 21, 1997 (DE) .............................................. 197 36 328

(51) Int. Cl.[7] .................. G06F 7/00; G05D 3/00
(52) U.S. Cl. ..................... 701/45; 701/36; 280/734; 280/735; 180/282; 340/436; 307/10.1
(58) Field of Search .................. 701/36, 45; 33/333, 33/366; 280/734, 735; 340/436; 180/268, 282, 271, 281; 307/10.1; 73/504.04, 504.03, 504.02, 510, 511

(56) References Cited

U.S. PATENT DOCUMENTS

| | | | |
|---|---|---|---|
| 4,531,300 | 7/1985 | Heidel et al. | 33/366 |
| 4,788,773 | 12/1988 | Palsgard et al. | 33/333 |
| 5,229,943 * | 7/1993 | Eigler et al. | 701/45 |
| 5,605,202 | 2/1997 | Dixon | 180/268 |
| 5,762,366 * | 6/1998 | Faye | 280/735 |
| 5,814,897 * | 9/1998 | Ito et al. | 307/10.1 |
| 5,835,007 * | 11/1998 | Kosiak | 340/436 |
| 5,890,084 * | 3/1999 | Halasz et al. | 701/45 |
| 5,996,409 * | 12/1999 | Funk et al. | 73/504.04 |
| 6,002,974 * | 12/1999 | Schiffmann | 701/36 |
| 6,002,975 * | 12/1999 | Schiffmann et al. | 701/36 |

* cited by examiner

Primary Examiner—Jacques H. Louis-Jacques
(74) Attorney, Agent, or Firm—Evenson, McKeown, Edwards & Lenahan, P.L.L.C.

(57) ABSTRACT

Devices and methods for controlling accident protection triggering devices in motor vehicles when there is a risk of a rollover of the vehicles determine a transverse measured value characteristic of the transverse acceleration from a transverse sensor in combination with a transverse tilt of the vehicle. Wheel rpm values of the wheels of the vehicle are determined from wheel rpm sensors. A transverse acceleration value that is exclusively characteristic of the transverse acceleration of the vehicle is calculated by a control device connected with these sensors from the rpm values. The transverse measured value is corrected in such fashion that a transverse tilt value is calculated therefrom that is exclusively characteristic of the transverse tilt, with accident protection triggering devices being actuated as a function of the transverse tilt value by the control device.

18 Claims, 4 Drawing Sheets

DEVICE AND METHOD FOR CONTROLLING ACCIDENT PROTECTION TRIGGERING DEVICES IN MOTOR VEHICLES

BACKGROUND AND SUMMARY OF THE INVENTION

This application claims the priority of German Application No. 197 36 328.8, filed Aug. 21, 1997, the disclosure of which is expressly incorporated by reference herein.

The invention relates to a device for controlling accident protection triggering devices in motor vehicles, with a transverse sensor that outputs a transverse measured value characteristic of the transverse acceleration combined with the transverse tilt of the vehicle to a control device that is connected with the transverse sensor in a data-transmitting fashion, by which control device the transverse measured value can be evaluated and an accident protection triggering device can be actuated depending on the evaluation. The invention also relates to a method for controlling accident protection triggering devices in motor vehicles when there is danger of a rollover.

Devices for controlling accident protection triggering devices when there is a risk of the vehicle overturning are currently employed in convertible automobiles for controlling extendable roll bars. The extension of the roll bars is reversible and has relatively little adverse effect on the occupants of the vehicle so that it is possible to extend the roll bar even when it cannot be determined exactly whether the vehicle is actually overturning or not. The requirements for conventional devices as regards possible improper triggering are therefore not particularly high.

FIG. 3 shows a conventional prior art device 100 for controlling a triggering device 101 for a roll bar. According to this figure, this device 100 has a transverse sensor 102 (bubble level sensor). The sensor 102 outputs a transverse measured value that is characteristic of the transverse acceleration combined with the transverse tilt of the vehicle to a control device 103 linked with transverse sensor 102 so that data is transmitted. Via the control device 103, the transverse measured value can be evaluated and the roll bar triggering device 101 can be actuated to activate a roll bar system 104 depending on the evaluation. Device 100 also has a lengthwise (longitudinal) sensor 105 with the same design as the transverse sensor 102, with-lengthwise sensor 105 being likewise linked with control device 103 so that data can be transmitted between them. This is done in such fashion that it outputs to control device 103 a characteristic lengthwise measured value for the lengthwise acceleration in combination with the lengthwise tilt of the vehicle. The control device 103 also evaluates the lengthwise measured value and actuates roll bar triggering device 101 as a function of this evaluation. The terms "lengthwise acceleration" and "lengthwise tilt" refer to the acceleration acting in the direction of the lengthwise or longitudinal axis of the vehicle in a system of coordinates that is integral with the vehicle and/or the tilt of the vehicle relative to the horizontal plane that takes place when the vehicle rotates around its transverse axis. The lengthwise tilt results, depending on the location of the lengthwise sensor on the vehicle, from the pitch angle of the vehicle (the angle between the lengthwise axis of the vehicle body and the lengthwise axis of the road) and the angle between the lengthwise axis of the road and the horizontal plane (the lengthwise sensor is mounted integrally with the chassis). The terms "transverse acceleration" and "transverse tilt" refer to the acceleration acting transversely to the lengthwise direction of the vehicle in a system of coordinates that is integral with the vehicle and/or the tilt of the vehicle relative to the horizontal plane that takes place when the vehicle is rotated around its lengthwise axis. The transverse tilt, depending on the location of the transverse sensor on the vehicle, results from the roll angle of the vehicle (the angle between the transverse axis of the vehicle body and the transverse axis of the road) and the angle between the transverse axis of the road and the horizontal plane (the transverse sensor is mounted on the vehicle body), or merely as the angle between the transverse axis of the road and the horizontal plane (the transverse sensor is mounted integrally with the chassis).

In addition to the transverse and lengthwise sensors 102 and 105 respectively, the conventional device 100 also has a G sensor 106 which detects a lifting movement of the vehicle from the ground and then outputs a characteristic signal to control device 103 which then actuates roll bar triggering device 101.

A conventional prior art bubble level sensor that can be used both as a lengthwise and a transverse sensor 102 and 105 respectively is shown schematically in FIG. 4. The bubble level sensor has two hollow cylindrical parts (bubble levels) 200' and 200" respectively, with the lengthwise axes of their cylinders located symmetrically with respect to one another relative to a vertical axis and each being inclined at an angle $\gamma_k$ to the horizontal, with the lengthwise axis of each cylinder lying in a plane with the vertical axis. These bubble levels 200', 200" are partially filled with liquid, with a gas bubble 201', 201" also being located in each of the bubble levels. The gas bubble, depending on the angular position of the lengthwise axis of the cylinder relative to the horizontal, assumes a certain position in bubble level 200' and/or 200". In the lengthwise direction of the respective bubble level 200' or 200", an optical device is located at a central position by which it can be determined when gas bubble 201', 201" is located in the middle as viewed in the lengthwise direction of bubble level 200' and/or 200". The optical device has an LED 202' and/or 202" and a phototransistor 203 located opposite the LED. When the bubble level sensor is located with its axis of symmetry parallel to the vertical axis of the coordinate system integral with the vehicle and with bubble levels 200', 200" inclined parallel to the transverse direction of the vehicle, a transverse tilt of the vehicle means that the respective bubble 201' or 201", depending on the direction of transverse tilting, moves in the respective bubble level 200' and/or 200". As soon as the vehicle is tilted at an angle $\gamma_k$ which represents the critical angle at which overturning of the vehicle can be expected, one gas bubble or the other 200' or 200", depending on the direction of transverse tilt, will be located in the middle of the respective bubble level 200' or 200", with this condition being detected by the optical device and transmitted to control device 103. The control device 103 in turn actuates roll bar triggering device 101. With bubble level sensors thus located, acceleration in the transverse direction of the vehicle is also detected since gas bubbles 201', 201" move in the respective bubble levels 200', 200" because of their lower inertia by comparison with the liquid, when the vehicle rounds a curve, in response to the magnitude and direction of the resultant centrifugal force. In this way, a transverse measured value is recorded that is characteristic of the transverse acceleration combined with the transverse inclination of the vehicle and in this case is an angle measurement value. If the optical device detects that one of gas bubbles 201', 201", because of a transverse acceleration and/or a transverse tilt of the vehicle, is located in the middle position in the respective bubble level 200', 200" corresponding to the reaching of critical angle $\gamma_k$, the roll bar triggering device 101 will be actuated. This bubble level sensor is also used in accordance with the same measuring principle for the lengthwise direction in which, as described above, it inputs a characteristic lengthwise measured value composed of the lengthwise acceleration and the lengthwise tilt of the vehicle, with the critical angle for the lengthwise direction of the vehicle as a rule being defined as larger than for the transverse direction.

In the conventional device 100 for controlling roll bar triggering device 101, however, there is the possibility that when the vehicle is moving rapidly, the roll bar system 104 will be triggered although the vehicle still has all four wheels on the road. This can occur if the transverse or lengthwise sensor signals an overturning of the vehicle because of the inertial behavior of the combination of the liquid and gas bubbles in the bubble levels that is different from that of the vehicle. As indicated above, however, the extension of the roll bar is not critical for the vehicle occupants so that the critical characteristic measured value, in this case the critical angle, will be predetermined with sufficient safety, with false triggerings being taken into account.

If provision is also made to actuate other accident protection triggering devices, for example airbags or pyrotechnically actuated belt tighteners, when there is a threat of the vehicle overturning, false triggerings can pose a danger while driving, and it is also necessary to reinstall at high expense the accident protection devices which in this case cannot be reversed after they are actuated.

As a result of the present invention, devices for controlling accident protection triggering devices and corresponding methods are provided by which false triggerings produced by incorrectly detecting an overturning danger of a vehicle can be prevented.

This is achieved according to the present invention by a device having two wheel rpm sensors connected with the control device in a data-transmitting fashion. The rpm sensors detect the wheel rpm values of at least two different wheels on different sides of the vehicle.

The goal cited above is also achieved according to the present invention by a method for controlling accident protection triggering devices in motor vehicles with the following acts being performed: a) determining a characteristic transverse measured value for the transverse acceleration in combination with the transverse tilt of the vehicle; b) determining wheel rpm values of at least two different wheels on different sides of the vehicle; c) calculating a transverse acceleration value from the wheel rpm values that is exclusively characteristic of the transverse acceleration; d) correcting the transverse measured values so that a transverse tilt value exclusively characteristic of transverse tilt is calculated from the transverse measured value; and e) actuating the accident protection triggering devices as a function of the transverse tilt value.

By means of the device and the method according to the present invention, it is possible to detect the transverse acceleration of the vehicle not only in combination with the transverse tilt thereof but also by evaluating the wheel rpm values to determine the transverse acceleration of the vehicle alone, so that during normal driving operation of the vehicle, i.e. when all or at least the two wheels to which the wheel rpm sensors are attached are in contact with the ground, the actual transverse tilt angle (characteristic transverse tilt value) of the vehicle can be determined by compensating the influence of the transverse acceleration on the transverse measured value. If this actual transverse tilt angle as determined has a non-critical value, the accident protection triggering devices will not be actuated even if actuation would be required according to the transverse measured value, since the vehicle is still in a stable driving state, i.e. with all wheels on the ground. The wheel rpm sensors are advantageously attached to non-driving wheels, since especially in the case of the drive wheels, wheel slip can occur in their direction of travel that results in errors in recording wheel rpm values. It is also advantageous to provide wheel rpm sensors on all wheels or, for example, to use the wheel rpm sensors of an ABS system that are mounted on all the wheels, so that the rpm values that are detected can be compared with one another and any deviations of the wheel rpm values can be corrected in accordance with the other measured wheel rpm values.

The device and the method according to the invention allow using a transverse sensor of the conventional type as described above. On the basis of wheel rpm values recorded on different sides of the vehicle, when the vehicle rounds a curve, the difference between the wheel rpm values will be used to determine the speed traveled on the curve and the curve radius traversed. From this the centripetal acceleration acting in the transverse direction of the vehicle as a result of rounding a curve is determined. Thus, the influence on the transverse measured value resulting from centripetal acceleration is compensated and the actual transverse tilt angle of the vehicle can be determined. Thus, by means of the device and the method according to the invention, the transverse measured value which previously was solely responsible for the decision to actuate an accident protection triggering device can be checked in order to avoid false triggerings of the type described above.

As an alternative to this solution, the above goal can also be achieved by a device with a wheel rpm sensor connected in a data transmitting fashion with the control device. The rpm sensor detects the wheel rpm of at least one wheel. A steering angle sensor is connected in a data-transmitting fashion with the control device. The steering angle sensor detects the steering angle of the vehicle.

Accordingly, as an alternative embodiment to the method described above, a method is provided for controlling accident protection triggering devices in motor vehicles whereby the following acts are performed: a) determination of a transverse measured value that is characteristic of the transverse acceleration in combination with the transverse tilt of the vehicle; b) determination of the wheel rpm of at least one wheel; c) determination of the steering angle of the vehicle; d) calculation of a transverse acceleration value that is exclusively characteristic of the transverse acceleration from the wheel rpm and the steering angle; d) Correction of the transverse measured value, so that a transverse tilt value that is exclusively characteristic of the transverse tilt is calculated from the transverse measured value; and e) actuation of the accident protection triggering devices as a function of the transverse tilt value.

This device and this method make it possible, as with the device and method of the first embodiment, to detect the transverse acceleration of the vehicle separately in order to thus determine, as well as the transverse measured value, the actual transverse tilt angle of the vehicle, which in addition to the determined transverse measured value is used to make a decision regarding the actuation of the accident protection triggering device. In this case, the transverse acceleration is determined from the rpm of at least one wheel and the steering angle of the vehicle, specifically with the curve radius being calculated from the steering angle, the speed of the vehicle in the curve being calculated from the wheel rpm determined in conjunction with the steering angle, and the transverse acceleration being determined from the speed in the curve and the radius of the curve. It is also possible when the wheel rpm values are measured at two wheels on different sides of the vehicle to detect, for example, the transverse acceleration of the vehicle under these conditions as well, when the vehicle has two wheels located on the same side of the vehicle in the air, so that the accident protection triggering devices in this case can be actuated even if the actual transverse tilt angle determined exceeds a critical value or if the gradient between two determined transverse tilt angles is so steep that overturning is to be expected. Advantageously, wheel rpm sensors are located on all wheels so that the accuracy of detecting wheel rpm values can be increased further, since errors in the measured wheel rpm that occur as a result of wheel slip for example can be detected by comparing them with the wheel rpm values detected by the other wheel rpm sensors. In addition, the curve radius determined from the wheel rpm values for the curve traveled by the vehicle can be compared with the curve radius determined from the steering angle of the vehicle, so that this comparison as well allows for correction of the detected wheel rpm values.

The goal recited above is also achieved by a device with a wheel rpm sensor connected in a data-transmitting fashion with the control device. The rpm sensor detects the wheel rpm values of at least one wheel.

For this purpose, a method according to the invention is proposed for controlling accident protection triggering devices in motor vehicles, with the following acts being performed: a) determining a characteristic lengthwise measured value for the lengthwise acceleration in combination with the lengthwise tilt of the vehicle; b) determining the wheel rpm value of at least one wheel; c) calculating a characteristic lengthwise acceleration value from the wheel rpm exclusively for the lengthwise acceleration; d) correcting the lengthwise measured value, so that a characteristic lengthwise tilt angle is calculated exclusively for the lengthwise tilt from the lengthwise measured value; and e) actuating the accident protection triggering devices as a function of the lengthwise tilt value.

The principle of this device and this method is the same as that of the devices and methods described in conjunction with the transverse direction of the vehicle; i.e. the influences on the measured value containing the acceleration and the tilt of the vehicle and which in this case are derived from the lengthwise acceleration of the vehicle, are compensated in this case to the lengthwise measured value in order to thus determine the actual lengthwise tilt angle (characteristic lengthwise tilt value) of the vehicle and thus to determine whether the vehicle is actually tilting around an axis, in this case the transverse axis. On the basis of the lengthwise tilt angle of the vehicle that is now available, the control device can check the reading of the lengthwise sensor and then decide whether to actuate the accident protection triggering device or not.

According to the invention, a conventional bubble level sensor can be used as the lengthwise sensor. The bubble level sensor detects the lengthwise tilt in combination with the lengthwise acceleration in the form of a characteristic lengthwise measured value, i.e. in the form of the position of the gas bubble relative to the bubble level. In the case of a vehicle traveling around a curve, errors occur in detecting the actual lengthwise acceleration of the vehicle, since in such a case the wheel rpm values of the wheels on different sides of the vehicles will change in different ways. Therefore, such a sensor is advantageously mounted on at least two different wheels of the vehicle on different sides of the vehicle, so that the wheel rpm values can be detected from wheels located on different sides of the vehicle in order to thereby be able to compensate for the influence on the lengthwise acceleration of the vehicle rounding a curve as detected by a wheel rpm value.

In one embodiment, it is preferred that the device have a steering angle sensor connected with the control device. The steering angle detects the steering angle of the vehicle. From the steering angle, in the case of a vehicle rounding a curve, the curve radius and curve direction can be determined so that the change in the wheel rpm that occurs as a result of rounding a curve can be compensated and thus the lengthwise acceleration of the vehicle when rounding a curve can likewise be determined exactly.

Accordingly, it is also preferred for the method described directly above that the steering angle of the vehicle be determined prior to method step c), and that in method step c) the lengthwise acceleration value that is exclusively characteristic of the lengthwise acceleration be calculated from the wheel rpm and the steering angle.

In this way, the influence of a vehicle rounding a curve on the wheel rpm value of a wheel and, hence, the influence of rounding a curve on the lengthwise acceleration of the vehicle as detected from the wheel rpm value can be compensated. If wheel rpm sensors are provided on wheels on different sides of the vehicle, then errors in detecting the wheel rpm values caused by wheel slip in the traveling direction can be corrected by comparing the curve radius determined from the steering angle of the vehicle with the curve radius determined from the wheel rpm values of the vehicle.

In general, the devices and method described in conjunction with the transverse direction of the vehicle can also be combined with the devices and methods described in conjunction with the lengthwise direction of the vehicle, with the same wheel rpm sensors, the same control device, and possibly the same steering angle sensor being used to determine the transverse and lengthwise accelerations.

Advantageously, it is also proposed for the devices described above that they have a yaw sensor connected in a data-transmitting fashion with the control device. The yaw sensor detects the yaw rate of the vehicle.

The term "yaw rate" refers to the rotational speed relative to the system of coordinates integral with the vehicle in the direction around the vertical axis thereof. Yaw rates develop, for example, when a vehicle skids, and cause centrifugal accelerations in the lengthwise and transverse directions of the vehicle, which are detected by the lengthwise and transverse sensors. These sensors can then possibly indicate an overturning of the vehicle although this does not actually occur. It is possible to use the device that contains the yaw sensor to compensate for the influences on the transverse and/or lengthwise measured values exerted by a yawing motion of the vehicle.

Accordingly, it is proposed for this method that the yaw rate of the vehicle be measured and that the influences resulting from the yaw rate on the transverse and lengthwise measured values be compensated. In this way, false triggerings of accident protection devices provided for use in the event of a vehicle overturning and caused by a yawing motion of the vehicle can be avoided.

Other objects, advantages and novel features of the present invention will become apparent from the following detailed description of the invention when considered in conjunction with the accompanying drawings.

DETAILED DESCRIPTION OF THE DRAWINGS

Figure 1:
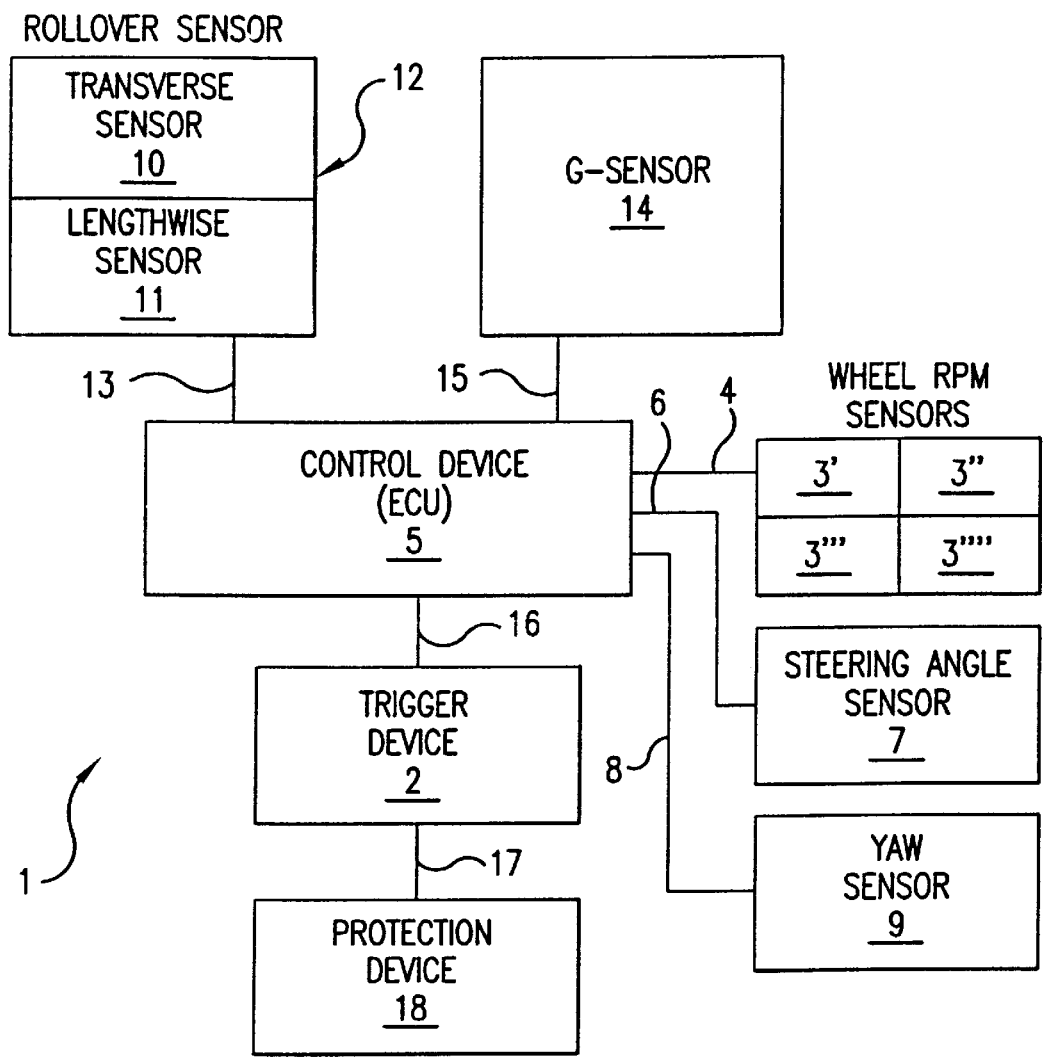
FIG. 1 shows in schematic block diagram form one embodiment of the device according to the present invention for controlling accident protection triggering devices.

FIG. 1 shows in schematic form one embodiment of the device 1 according to the invention for controlling accident protection triggering devices 2 for a four-wheel motor vehicle such as an automobile or sport-utility vehicle (not shown). The triggering devices 2 are provided for triggering accident protection devices that are provided for use in the event the vehicle overturns. Device 1 has four wheel rpm sensors 3', 3'', 3''', and 3'''', each of which is associated with one wheel of the motor vehicle in order to detect the wheel rpm of the respective wheel. Wheel rpm sensors 3' to 3'''' are each connected by a data lead 4 with a control device 5. Device 5 also has a steering angle sensor 7 that is connected through a data lead 6 with control device 5, by which sensor 7 the steering angle of the motor vehicle can be detected, and fed to control device 5. A yaw sensor 9 is also connected with control device 5 through a data lead 8, by which sensor 9 the yaw rate of the motor vehicle can be detected and entered into control device 5.

Device 1 also has a transverse sensor 10 and a lengthwise sensor 11 which together form a conventional rollover sensor 12. Transverse sensor 10 detects, as described above, the acceleration of the motor vehicle in its transverse direction in combination with the transverse tilt of the motor vehicle, in the form of a characteristic transverse measured value. Lengthwise sensor 11 detects the acceleration of the motor vehicle in its lengthwise direction in combination with the lengthwise tilt of the motor vehicle in the form of a characteristic lengthwise measured value. Rollover sensor 12 is connected by a data lead 13 with control device 5, so that the measured values detected by the transverse and lengthwise sensors 10, 11 can be entered through this data lead 13 into control device 5.

In addition, device 1 has a G sensor 14 that is connected through a data lead 15 with control device 5. The G sensor detects a state in which the motor vehicle becomes weightless, as happens for example in the event that it leaves the ground. Control device 5 is connected through a data lead 16 with accident protection triggering device 2, which in turn is connected by a data lead 17 with an accident protection device 18. Although only one accident protection triggering device 2 with an associated accident protection device 18 is shown connected with control device 5, any number of triggering devices with accident protection devices connected with them can be connected to control device 5. It is also possible to provide only one accident protection triggering device with which a plurality of accident protection devices 18 are connected in a data-transmitting fashion.

Figure 2:
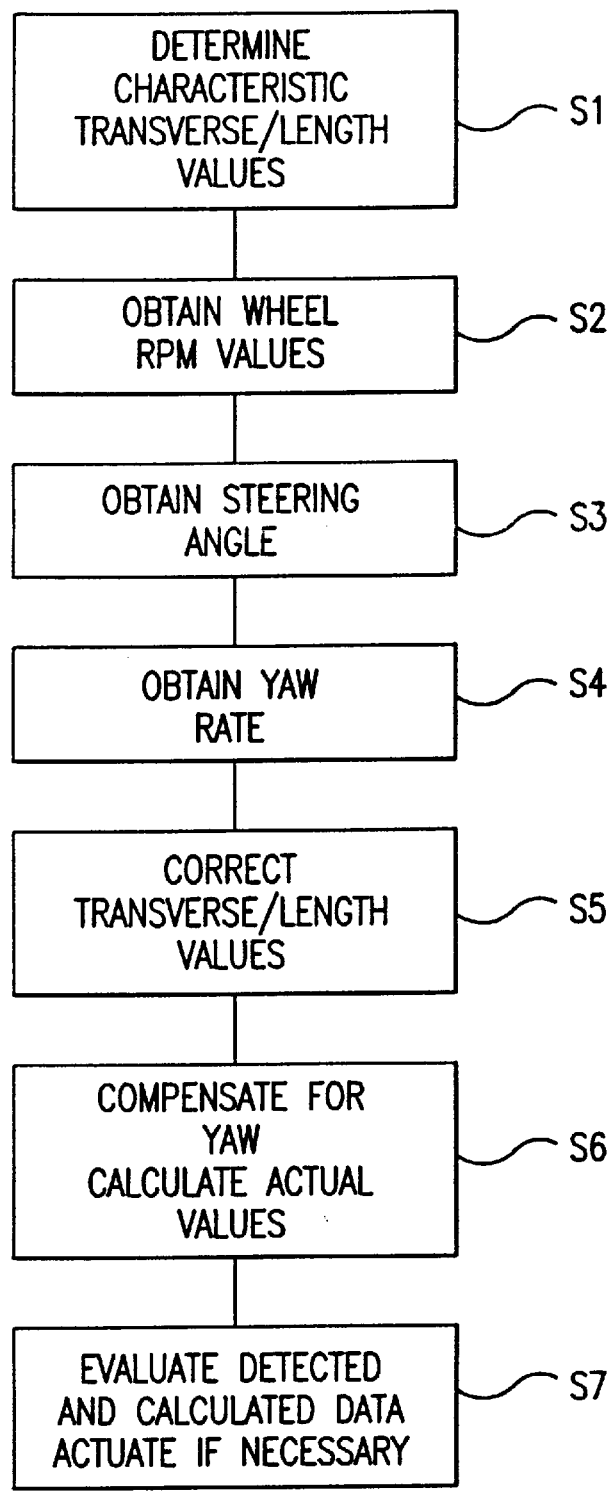
FIG. 2 is a block diagram explaining the method according to the present invention for controlling accident protection triggering devices.
Figure 3:
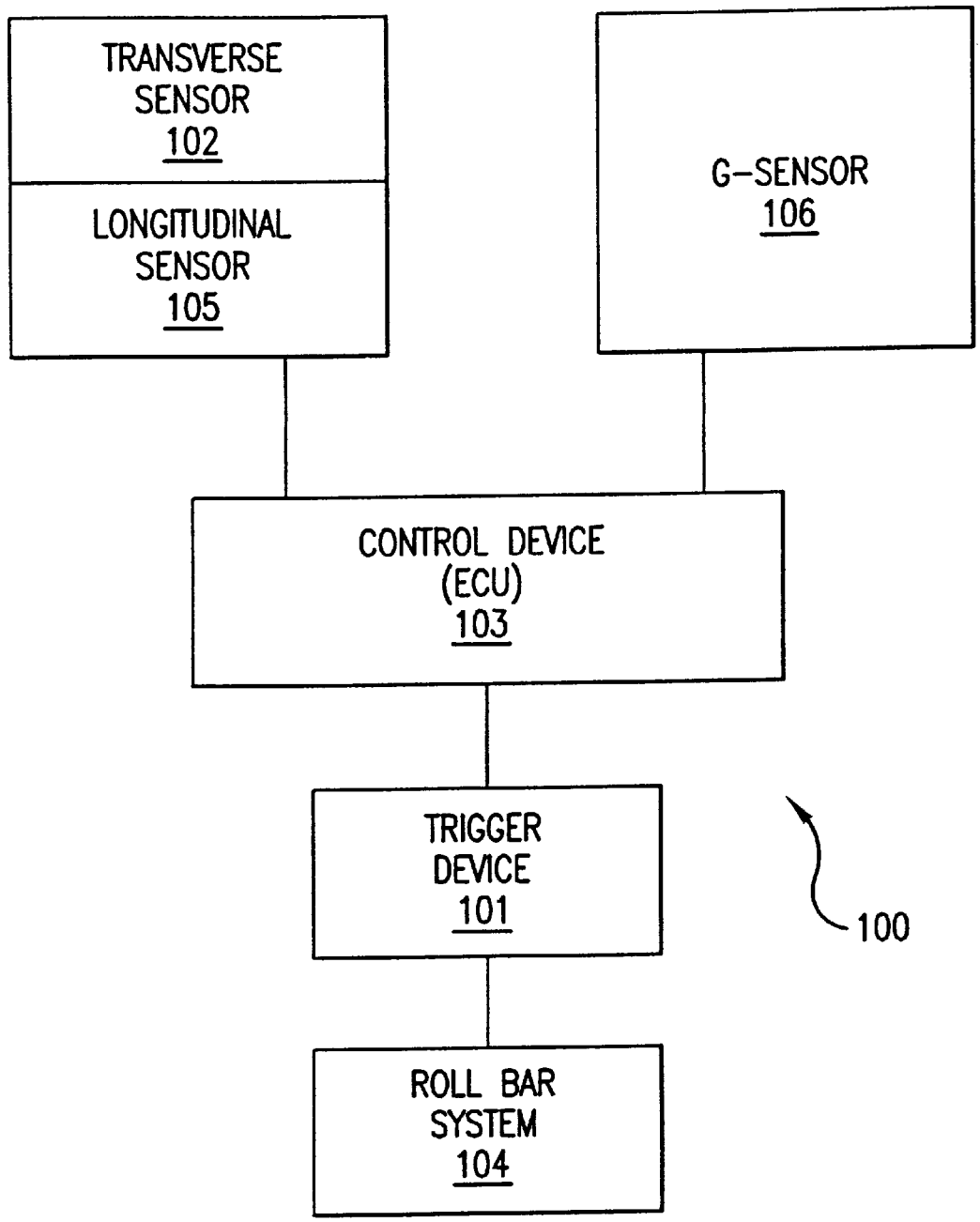
FIG. 3 is a conventional prior art device for controlling a triggering device for a roll bar.
Figure 4:
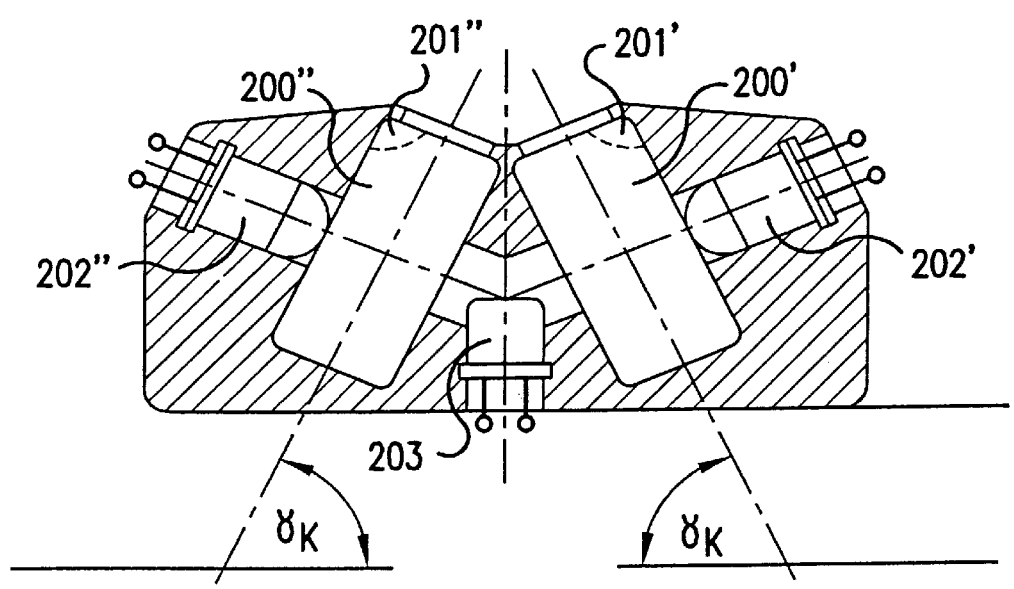
FIG. 4 is a sectional view through a conventional prior art bubble level sensor used as a transverse and/or lengthwise sensor.

In the following, the method according to the invention for controlling the accident protection triggering devices will be explained with reference to FIGS. 1 and 2.

In step S1, rollover sensor 12, on the basis of transverse sensor 10 and lengthwise sensor 11, determines a characteristic transverse and/or lengthwise measured value that is composed of the transverse acceleration of the vehicle and its transverse tilt and/or of the lengthwise acceleration of the vehicle and its lengthwise tilt. The characteristic measured values detected are entered into control device 5 through data lead 13.

In step S2, by means of wheel rpm sensors 3' to 3'''', the wheel rpm values of the four wheels of the motor vehicle are detected and fed to control device 5 through data lead 4.

In step S3, the steering angle of the vehicle is detected by means of a steering angle sensor and is entered into control device 5 by means of data lead 6.

In step S4, the yaw rate of the motor vehicle is detected and entered through the data lead into control device 5.

In step S5, control device 5 evaluates the data entered into it. For this purpose, the actual lengthwise and transverse accelerations of the vehicle are calculated from the wheel rpm values entered into control device 5, using the entered steering angle of the curve radius of a curve possibly traveled by the motor vehicle. The lengthwise and transverse accelerations determined from the wheel rpm values are corrected in accordance with the curve radius determined.

In step S6, using the entered yaw rate, the influences on the transverse and lengthwise measured values caused by a possible yawing motion of the vehicle are compensated and the actual transverse tilt and/or lengthwise tilt angles of the vehicle are calculated from the actual transverse and lengthwise accelerations of the vehicle and the corrected transverse and/or lengthwise measured values. If no steering angle sensor 7 and/or no yaw sensor 9 are provided, the steps related to steering angle sensor 7 and/or yaw sensor 9 are eliminated from steps S5 and S6.

In step S7, control device 5 actuates accident protection triggering device 2 on the basis of an evaluation of the detected and calculated data. This involves a check to determine whether a signal from the G sensor is present that indicates a lifting of the vehicle off the ground. In addition, the transverse and lengthwise measured values are compared with the critical transverse and lengthwise measured values and, if they are exceeded, control device 5 also checks on the basis of the determined actual transverse tilt and lengthwise tilt of the vehicle, whether the vehicle is actually titling. If it is found that the vehicle is still in a stable driving state, accident protection triggering device 2 will not be actuated. If, on the other hand, a critical transverse or lengthwise tilt is found, accident protection triggering device 2 will be actuated.

If steering angle sensor 7 is not used, and if two wheels on the same side of the vehicle are simultaneously in the air, it will not be possible to determine the actual transverse acceleration of the vehicle or to determine exactly the lengthwise acceleration of the vehicle. In this case, control device 5 will simply actuate the accident protection triggering device on the sole basis of the transverse and/or lengthwise measured value.

Lifting of two wheels on the same side of the vehicle can be detected by means of control device 5, for example by virtue of the fact that the wheel rpm values of the wheels on this side change abruptly, while the wheel rpm values on the other side of the vehicle still have wheel rpm values associated with the previous stable driving state. Even in the case when the wheels lock up, it is not possible to determine the actual transverse and lengthwise acceleration from the wheel rpm values. However, this can also be detected by control device 5, whereupon accident protection triggering device 2 is actuated solely on the basis of the transverse and lengthwise measured values.

It is readily understood by those of skill in the art that the method according to the present invention, as described herein, can be implemented by an appropriately programmed control device 5 using software, hardware, or a combination thereof. In this regard, it will be understood that the control device 5 can be a microprocessor based control device for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for controlling at least one accident protection triggering device in a motor vehicle, the device comprising:
   a transverse sensor which outputs a transverse measured value characteristic of a transverse acceleration combined with a transverse tilt of the motor vehicle;
   two wheel rpm sensors which output sensed wheel rpm values of at least two different wheels on different sides of the motor vehicle;
   a control device which couples with the transverse sensor and the two wheel rpm sensors in a data-transmitting fashion, said control device evaluating the transverse measured value in accordance with the wheel rpm values for controlling the accident protection triggering device; and
   a yaw sensor coupled in a data-transmitting fashion with the control device, said yaw sensor detecting a yaw rate of the vehicle which is used by the control device to control the accident protection triggering device.

2. A device for controlling at least one accident protection triggering device in a motor vehicle, the device comprising:
   a transverse sensor which outputs a transverse measured value characteristic of a transverse acceleration in combination with a transverse tilt of the motor vehicle;
   a wheel rpm sensor which detects a wheel rpm of at least one wheel;
   a steering angle sensor which determines a steering angle of the motor vehicle; and
   a control device coupled in a data-transmitting fashion with the transverse sensor, the wheel rpm sensor, and the steering angle sensor, said control device evaluating the transverse measured value in accordance with the wheel rpm and the steering angle for controlling the accident protection triggering device.

3. The device according to claim 2, further comprising a yaw sensor coupled in a data-transmitting fashion with the control device, said yaw sensor detecting a yaw rate of the vehicle which is used by the control device to control the accident protection triggering device.

4. A device for controlling at least one accident protection triggering device in a motor vehicle, the device comprising:
   a lengthwise sensor which outputs a characteristic measured value for a lengthwise acceleration in combination with a lengthwise tilt of the motor vehicle;
   a wheel rpm sensor which outputs a wheel rpm of at least one wheel;
   a control device coupling in a data-transmitting fashion with the lengthwise sensor and the wheel rpm sensor, said control device evaluating the lengthwise measured value in accordance with the wheel rpm for controlling the accident protection triggering device; and
   a yaw sensor coupled in a data-transmitting fashion with the control device, said yaw sensor detecting a yaw rate of the vehicle which is used by the control device to control the accident protection triggering device.

5. A device for controlling at least one accident protection triggering device in a motor vehicle, the device comprising:
   a lengthwise sensor which outputs a characteristic measured value for a lengthwise acceleration in combination with a lengthwise tilt of the motor vehicle;
   a wheel rim sensor which outputs a wheel rpm of at least one wheel;
   a control device coupling in a data-transmitting fashion with the lengthwise sensor and the wheel rpm sensor, said control device evaluating the lengthwise measured value in accordance with the wheel rpm for controlling the accident protection triggering device; and a steering angle sensor coupled in a data-transmitting fashion with the control device, said steering angle sensor detecting the steering angle used by the control device for controlling the accident protection triggering device.

6. The device according to claim 5, further comprising a yaw sensor coupled in a data-transmitting fashion with the control device, said yaw sensor detecting a yaw rate of the vehicle which is used by the control device to control the accident protection triggering device.

7. A method for controlling at least one accident protection triggering device in a motor vehicle, the method comprising the acts of:
   a) determining a characteristic transverse measured value for a transverse acceleration in combination with a transverse tilt of the motor vehicle;
   b) determining wheel rpm values from at least two different wheels on different sides of the motor vehicle;
   c) calculating a characteristic transverse acceleration from the wheel rpm values exclusively for the transverse acceleration;
   d) correcting the transverse measured value so that a transverse tilt value is calculated from the transverse measured value that is exclusively characteristic of transverse tilt; and
   e) actuating the accident protection triggering device as a function of the transverse tilt values,
   wherein a yaw rate of the motor vehicle is measured, and wherein influences on the transverse and lengthwise measured values resulting from the yaw rate are compensated.

8. A method for controlling at least one accident protection triggering device in a motor vehicle, the method comprising the acts of:
   a) determining a characteristic transverse measured value for a transverse acceleration in combination with a transverse tilt of the motor vehicle;
   b) determining the wheel rpm of at least one wheel;
   c) determining the steering angle of the motor vehicle;
   d) calculating from the wheel rpm and the steering angle a transverse acceleration value that is exclusively characteristic of the transverse acceleration;
   e) correcting the transverse measured value, so that a transverse tilt value is calculated from the transverse measured value that is exclusively characteristic of transverse tilt; and f) actuating the accident protection triggering device as a function of the transverse tilt value.

9. The method according to claim 8, wherein a yaw rate of the motor vehicle is measured, and wherein influences on the transverse and lengthwise measured values resulting from the yaw rate are compensated.

10. A method for controlling at least one accident protection triggering device in a motor vehicle, the method comprising the acts of:
   a) determining a characteristic lengthwise measured value of a lengthwise acceleration in combination with a lengthwise tilt of the motor vehicle;
   b) determining the wheel rpm value of at least one wheel;
   c) calculating a lengthwise acceleration value from the wheel rpm that is exclusively characteristic of the lengthwise acceleration;
   d) correcting the lengthwise measured value so that a lengthwise tilt value is calculated from the lengthwise measured value that is exclusively characteristic of the lengthwise tilt; and
   e) actuating the accident protection triggering device as a function of the lengthwise tilt value,
   wherein a yaw rate of the motor vehicle is measured, and wherein influences on the transverse and lengthwise measured values resulting from the yaw rate are compensated.

11. A method for controlling at least one accident protection triggering device in a motor vehicle, the method comprising the acts of:
   a) determining a characteristic lengthwise measured value of a lengthwise acceleration in combination with a lengthwise tilt of the motor vehicle;
   b) determining the wheel rpm value of at least one wheel;
   c) calculating a lengthwise acceleration value from the wheel rpm that is exclusively characteristic of the lengthwise acceleration;
   d) correcting the lengthwise measured value so that a lengthwise tilt value is calculated from the lengthwise measured value that is exclusively characteristic of the lengthwise tilt; and
   e) actuating the accident protection triggering device as a function of the lengthwise tilt value, wherein a steering angle of the vehicle is determined before method step c), and the lengthwise acceleration value that is exclusively characteristic of the lengthwise acceleration is calculated in method step c) from the wheel rpm and the steering angle.

12. The method according to claim 11, wherein a yaw rate of the motor vehicle is measured, and wherein influences on the transverse and lengthwise measured values resulting from the yaw rate are compensated.

13. A software product for controlling at least one accident protection triggering device in a motor vehicle, comprising a computer readable medium having stored thereon program code segments that:
   a) determine a characteristic transverse measured value for a transverse acceleration in combination with a transverse tilt of the motor vehicle;
   b) determine wheel rpm values from at least two different wheels on different sides of the motor vehicle;
   c) calculate a characteristic transverse acceleration from the wheel rpm values exclusively for the transverse acceleration;
   d) correct the transverse measured value so that a transverse tilt value is calculated from the transverse measured value that is exclusively characteristic of transverse tilt; and
   e) actuate the accident protection triggering device as a function of the transverse tilt value,
   wherein the computer readable medium has further stored thereon a program code segment that measures a yaw rate of the motor vehicle and compensates influences on the transverse and lengthwise measured values resulting from the yaw rate.

14. A software product for controlling at least one accident protection triggering device in a motor vehicle, comprising a computer readable medium having stored thereon program code segments that:
   a) determine a characteristic transverse measured value for a transverse acceleration in combination with a transverse tilt of the motor vehicle;
   b) determine the wheel rpm of at least one wheel;
   c) determine the steering angle of the motor vehicle;
   d) calculate from the wheel rpm and the steering angle a transverse acceleration value that is exclusively characteristic of the transverse acceleration;
   e) correct the transverse measured value, so that a transverse tilt value is calculated from the transverse measured value that is exclusively characteristic of transverse tilt; and
   f) actuate the accident protection triggering device as a function of the transverse tilt value.

15. The software product according to claim 14, wherein the computer readable medium has further stored thereon a program code segment that measures a yaw rate of the motor vehicle and compensates influences on the transverse and lengthwise measured values resulting from the yaw rate.

16. A software product for controlling at least one accident protection triggering device in a motor vehicle, comprising a computer readable medium having stored thereon program code segments that:
   a) determine a characteristic lengthwise measured value of a lengthwise acceleration in combination with a lengthwise tilt of the motor vehicle;
   b) determine the wheel rpm value of at least one wheel;
   c) calculate a lengthwise acceleration value from the wheel rpm that is exclusively characteristic of the lengthwise acceleration;
   d) correct the lengthwise measured value so that a lengthwise tilt value is calculated from the lengthwise measured value that is exclusively characteristic of the lengthwise tilt; and
   e) actuate the accident protection triggering device as a function of the lengthwise tilt values wherein the computer readable medium has further stored thereon a program code segment that measures a yaw rate of the motor vehicle and compensates influences on the transverse and lengthwise measured values resulting from the yaw rate.

17. A software product for controlling at least one accident protection triggering device in a motor vehicle, comprising a computer readable medium having stored thereon program code segments that:
   a) determine a characteristic lengthwise measured value of a lengthwise acceleration in combination with a lengthwise tilt of the motor vehicle,
   b) determine the wheel rpm value of at least one wheel;
   c) calculate a lengthwise acceleration value from the wheel rpm that is exclusively characteristic of the lengthwise acceleration;

d) correct the lengthwise measured value so that a lengthwise tilt value is calculated from the lengthwise measured value that is exclusively characteristic of the lengthwise tilt; and e) actuate the accident protection triggering device as a function of the lengthwise tilt value, wherein the computer readable medium has further stored thereon program code segments that determine a steering angle of the motor vehicle and calculate the lengthwise acceleration value that is exclusively characteristic of the lengthwise acceleration from the wheel rpm and the steering angle.

18. The software product according to claim 17, wherein the computer readable medium has further stored thereon a program code segment that measures a yaw rate of the motor vehicle and compensates influences on the transverse and lengthwise measured values resulting from the yaw rate.

* * * * *